(12) United States Patent
Whang

(10) Patent No.: US 10,733,033 B2
(45) Date of Patent: Aug. 4, 2020

(54) DYNAMIC MESSAGING FOR AN APPLICATION PROGRAMMING INTERFACE

(71) Applicant: HEWLETT PACKARD ENTERPRISE DEVELOPMENT LP, Houston, TX (US)

(72) Inventor: Yeon Whang, Alpharetta, GA (US)

(73) Assignee: HEWLETT PACKARD ENTERPRISE DEVELOPMENT LP, Houston, TX (US)

(*) Notice: Subject to any disclaimer, the term of this patent is extended or adjusted under 35 U.S.C. 154(b) by 148 days.

(21) Appl. No.: 15/566,653

(22) PCT Filed: Apr. 17, 2015

(86) PCT No.: PCT/US2015/026273
§ 371 (c)(1),
(2) Date: Oct. 13, 2017

(87) PCT Pub. No.: WO2016/167783
PCT Pub. Date: Oct. 20, 2016

(65) Prior Publication Data
US 2018/0121267 A1    May 3, 2018

(51) Int. Cl.
*G06F 9/54* (2006.01)
*H04L 29/08* (2006.01)

(52) U.S. Cl.
CPC .............. *G06F 9/546* (2013.01); *G06F 9/544* (2013.01); *H04L 67/02* (2013.01); *H04L 67/16* (2013.01)

(58) Field of Classification Search
CPC .......... G06F 9/546; G06F 9/544; H04L 67/02; H04L 67/16
See application file for complete search history.

(56) References Cited

U.S. PATENT DOCUMENTS

| | | | |
|---|---|---|---|
| 6,594,685 B1 | 7/2003 | Mishra et al. | |
| 7,519,976 B2 | 4/2009 | Blevins et al. | |
| 7,865,574 B1 | 1/2011 | Laura et al. | |
| 8,782,744 B1 | 7/2014 | Fuller et al. | |
| 8,914,632 B1 | 12/2014 | Shankar et al. | |
| 9,984,136 B1* | 5/2018 | Read | G06F 16/256 |
| 2004/0177361 A1 | 9/2004 | Bernhard et al. | |
| 2013/0173896 A1 | 7/2013 | Parker et al. | |
| 2013/0318154 A1 | 11/2013 | Jacobson et al. | |

(Continued)

OTHER PUBLICATIONS

Custom API, (Web Page), Microsoft, Jul. 16, 2014, 3 pps, https://msdn.microsoft.com/en-us/library/azure/dn280974.aspx.
(Continued)

*Primary Examiner* — Doon Y Chow
*Assistant Examiner* — Kimberly L Jordan
(74) *Attorney, Agent, or Firm* — Hewlett Packard Enterprise Patent Department

(57) ABSTRACT

Examples disclosed herein comprise dynamic message instructions to map each of a plurality of data identifiers to at least one granular application programming interface (API), receive a message comprising at least one of the plurality of data identifiers from a client, retrieve, via the at least one granular API for the at least one of the plurality of data identifiers, a data resource, and provide the retrieved data resources to the client.

16 Claims, 3 Drawing Sheets

(56) References Cited

U.S. PATENT DOCUMENTS

2014/0208391 A1* 7/2014 Farnsworth ............. H04L 51/28
                                                        726/4
2014/0279936 A1   9/2014 Bernbo et al.
2014/0289539 A1   9/2014 Osterwalder et al.
2016/0301739 A1* 10/2016 Thompson .............. G06F 9/541

OTHER PUBLICATIONS

International Searching Authority, Appl No. PCT/US2015/026273, filed Apr. 17, 2015, Search Report and Written Opinion, 10pp, dated Jan. 15, 2016.

* cited by examiner

DYNAMIC MESSAGING FOR AN APPLICATION PROGRAMMING INTERFACE

BACKGROUND

Application programming interfaces (APIs) allow for communication between applications, threads, objects and other computing processes. In some cases, APIs may provide a method to allow the other process to access resources or functions without needing to implement the underlying code independently.

BRIEF DESCRIPTION OF THE DRAWINGS

In the accompanying drawings, like numerals refer to like components or blocks. The following detailed description references the drawings, wherein.

DETAILED DESCRIPTION

As described above, APIs provide accessible methods to allow other applications and/or processes to request resources and/or performance of functions. For example, one API may provide a database connection for another process, a second API may provide data retrieval functions for the database and a third API may provide data upload functions, allowing the other application/process to perform its own functionality on the data associated with the database without needing to implement database-specific mechanisms.

In the description that follows, reference is made to the term, "machine-readable storage medium." As used herein, the term "machine-readable storage medium" refers to any electronic, magnetic, optical, or other physical storage device that stores executable instructions or other data (e.g., a hard disk drive, random access memory, flash memory, etc.).

Figure 1:
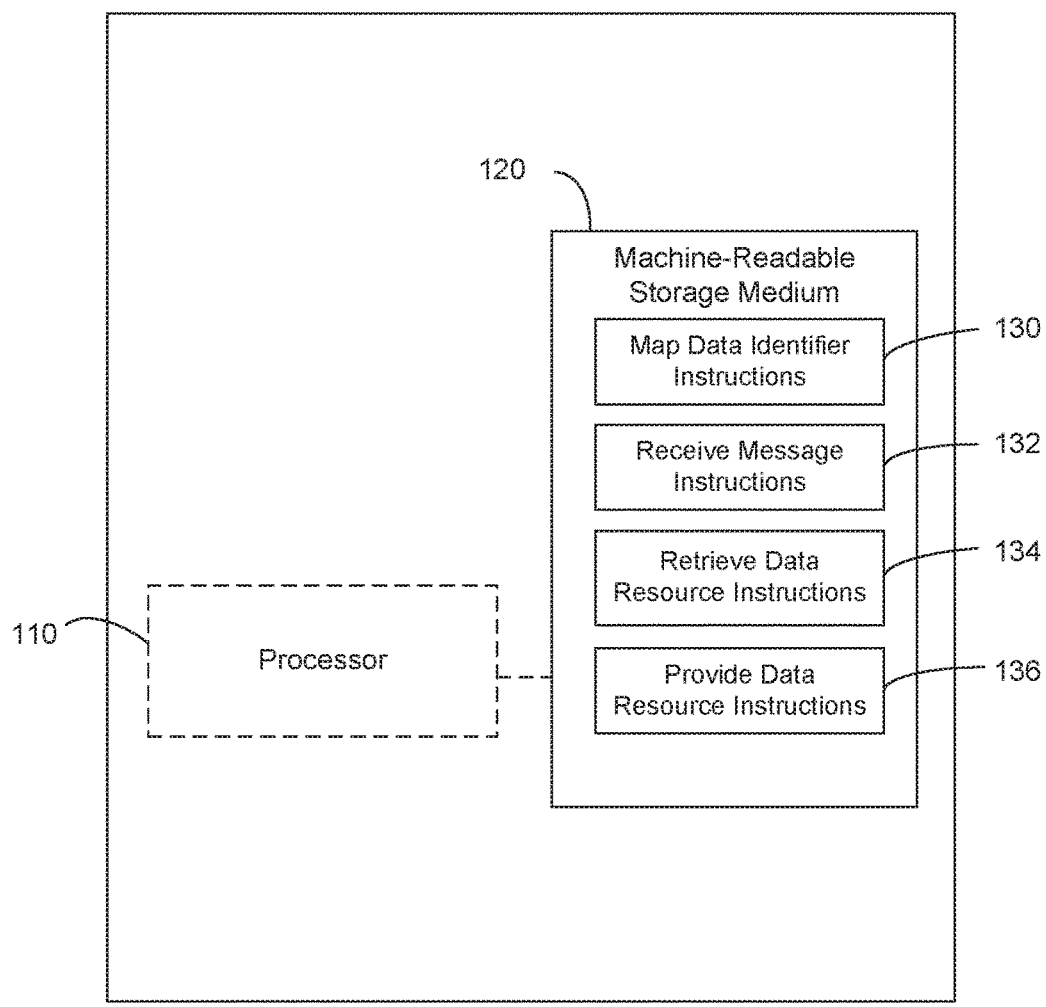
FIG. 1 is a block diagram of an example dynamic messaging device consistent with disclosed implementations.

Referring now to the drawings, FIG. 1 is a block diagram of an example dynamic messaging device 100 consistent with disclosed implementations. Dynamic messaging device 100 may comprise a processor 110 and a non-transitory machine-readable storage medium 120. Dynamic messaging device 100 may comprise a computing device such as a server computer, a desktop computer, a laptop computer, a handheld computing device, a mobile phone, or the like.

Processor 110 may comprise a central processing unit (CPU), a semiconductor-based microprocessor, or any other hardware device suitable for retrieval and execution of instructions stored in machine-readable storage medium 120. In particular, processor 110 may fetch, decode, and execute a plurality of map data identifier instructions 130, receive message instructions 132, retrieve data resource instructions 134, and provide data resource instructions 136 to implement the functionality described in detail below.

Executable instructions such as map data identifier instructions 130, receive message instructions 132, retrieve data resource instructions 134, and provide data resource instructions 136 may be stored in any portion and/or component of machine-readable storage medium 120. The machine-readable storage medium 120 may comprise both volatile and/or nonvolatile memory and data storage components. Volatile components are those that do not retain data values upon loss of power. Nonvolatile components are those that retain data upon a loss of power.

The machine-readable storage medium 120 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Map data identifier instructions 130 may map each of a plurality of data identifiers to at least one granular application programming interface (API). For example, each of the granular APIs may be responsible for retrieving at least one data resource and/or performing at least one method.

In some embodiments, map data identifier instructions 130 may register a plurality of granular APIs and generate the plurality of identifiers according to the registered plurality of granular APIs. For example, each granular API may register itself via an associated programmatic object to a central dynamic API. The central dynamic API may provide a published list of identifiers associated with the data resources and/or methods made available by each of the granular APIs as a message template.

For example, a granular API named ThingAPI may be accessed via HTTP at a uniform resource locator (URL) address of http://www.example.com/thing, an API named CustomerAPI may be accessed via HTTP at a URL of http://www.example.com/customer/, and an API named ConnectionAPI may be accessed via HTTP at a URL of http://www.example.com/connection/. Table 1, below, illustrates how different data resources may be mapped to the granular APIs. In some embodiments, the path may be appended to the URL for the respective granular API to access the individual resource.

TABLE 1

| Data Identifier | Path | Granular API | Dependency |
|---|---|---|---|
| {thingID} | /uuid | ThingAPI | |
| {thingType} | /thingType | ThingAPI | |
| {thingTypeID} | /thingType/uuid | ThingAPI | |
| {thing} | * | ThingAPI | |
| {email} | /contact/email | CustomerAPI | {thingID} |
| {customer} | * | CustomerAPI | {thingID} |
| {connectionID} | /connectID | ConnectionAPI | |
| {thingID} | /thingID | ConnectionAPI | |

Receive message instructions 132 may receive a message comprising at least one of the plurality of data identifiers from a client. The client may comprise, for example, another application, process, software object, user, etc.

For example, a web application may provide a message to the central dynamic API comprising a plurality of data identifiers. In some embodiments, the message may be programming language and/or format-independent. In some embodiments, the message may adhere to the format of the message template published by the central dynamic API. For example, the message may be provided via a standard communication protocol, such as TCP/IP and/or HTTP, with a message payload simply comprising a list of data identifiers. Using the example data resources in Table 1, a message payload may simply comprise the following: "{thingType}: {thingID}, Email: {email}." As another example, the message may be constructed in XML, such as:

```
<thing>
  <thingType>{thingType}</thingType>
  <thingID>{thingID}</thingID>
  <email>{email}</email>
</thing>
```

Retrieve data resource instructions 134 may retrieve, via the at least one granular API for the at least one of the plurality of data identifiers, a data resource. For example, upon receipt of the message, the central dynamic API may parse the message for the data identifiers and identify which granular APIs need to be executed. The central dynamic API may then execute the granular API methods to retrieve each of those data resources. For example, upon parsing the {thingType} data identifier, the dynamic API may execute the granular API from http://www.example.com/thing/thingType to retrieve the associated data resource.

In some embodiments, the message may comprise security and/or permissions information, such as a user identifier, a password, an authorization token, and/or another type of indication that the requesting client is authorized to access the requested data resource. Such authorization requirements may, for example, be identified as part of the registration process of the granular APIs.

In some embodiments, retrieve data resource instructions 134 may identify at least one dependency between the at least one granular API and a second granular API. For example, retrieving the {email} data resource via the CustomerAPI may require a respective {thingID} to retrieve the correct resource.

In some embodiments, different granular APIs may be able to retrieve the same resource. For example, both the ConnectionAPI and the ThingAPI have access to the associated {thingID} resource.

Provide data resource instructions 136 may provide the retrieved data resources to the client. For example, if an XML message comprising the data identifiers is received, a response XML message may be constructed replacing the data identifiers with the retrieved data resources.

Figure 2:
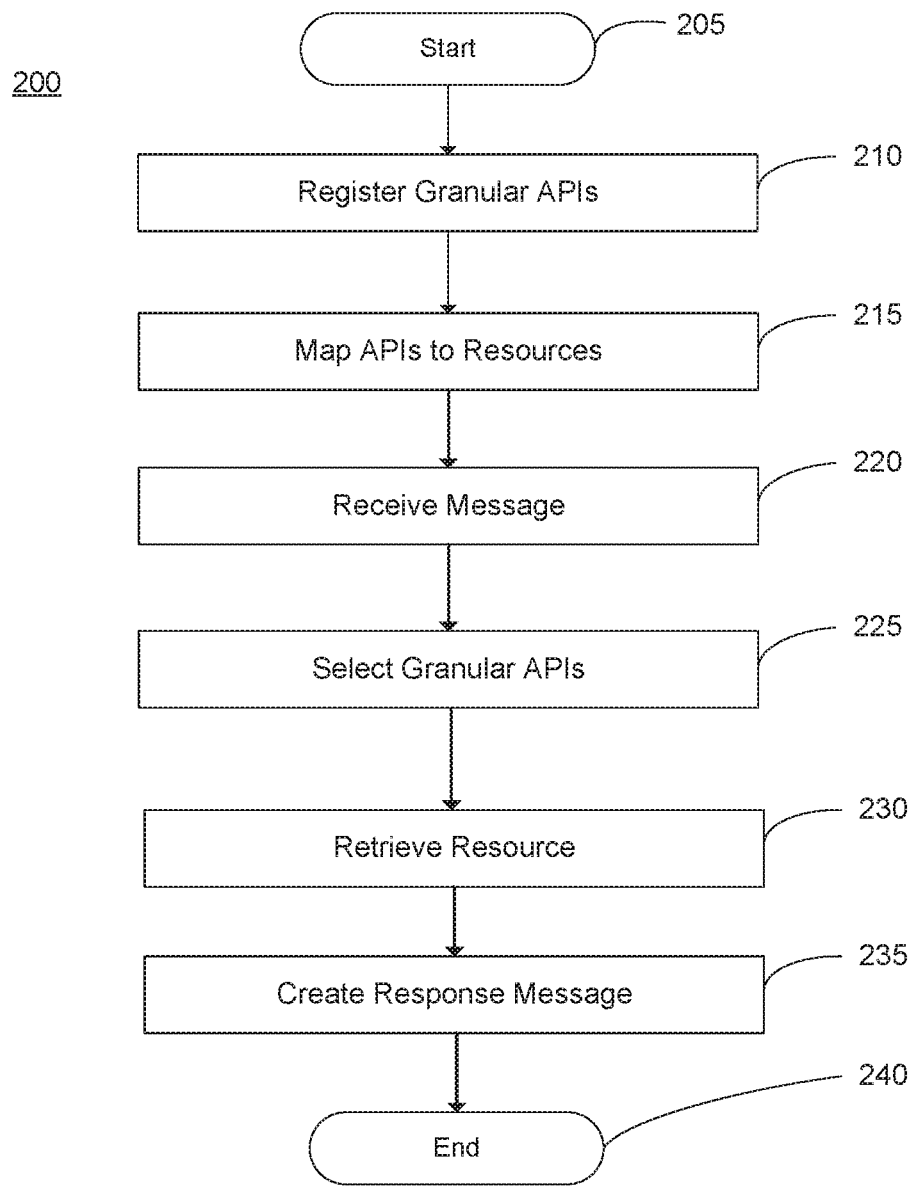
FIG. 2 is a flowchart of an embodiment of a method for dynamic messaging consistent with disclosed implementations.

FIG. 2 is a flowchart of an embodiment of a method 200 for dynamic messaging consistent with disclosed implementations. Although execution of method 200 is described below with reference to the components of dynamic messaging device 100, other suitable components for execution of method 200 may be used.

Method 200 may start in block 205 and proceed to block 210 where device 100 may register a plurality of granular application programming interfaces (APIs), In some embodiments, map data identifier instructions 130 may register a plurality of granular APIs and generate the plurality of identifiers according to the registered plurality of granular APIs. For example, each granular API may register itself via an associated programmatic object to a central dynamic API. The central dynamic API may provide a published list of identifiers associated with the data resources and/or methods made available by each of the granular APIs as a message template.

Method 200 may then proceed to block 215 where device 100 may map each of the plurality of granular APIs to each of a plurality of available resources. For example, a granular API named ThingAPI may be accessed via HTTP at a uniform resource locator (URL) address of http://www.example.com/thing, an API named CustomerAPI may be accessed via HTTP at a URL of http://www.other-example.com/customer/, and an API named ConnectionAPI may be accessed via HTTP at a URL of http://www.example.com/connection/. Table 1, above, illustrates how different data resources may be mapped to the granular APIs. In some embodiments, the path may be appended to the URL for the respective granular API to access the individual resource.

Method 200 may then proceed to block 220 where device 100 may receive a message comprising a plurality of data identifiers associated with the plurality of available resources. In some embodiments, receive message instructions 132 may receive a message comprising at least one of the plurality of data identifiers from a client. For example, a web application may provide a message to the central dynamic API comprising a plurality of data identifiers. In some embodiments, the message may be programming language and/or format-independent. In some embodiments, the message may adhere to the format of the message template published by the central dynamic API. For example, the message may be provided via a standard communication protocol, such as TCP/IP and/or HTTP, with a message payload simply comprising a list of data identifiers. Using the example data resources in Table 1, a message payload may simply comprise the following: "{thingType}: {thingID}, Email: {email}."

Method 200 may then proceed to block 225 where device 100 may select at least one of the plurality of granular APIs according to the plurality of data identifiers. For example, retrieve data resource instructions 134 may identify which of the mapped granular APIs are able to retrieve the resources for the data identifiers in the message.

In some embodiments, at least one dependency between the at least one granular API and a second granular API may be identified. For example, retrieving an {email} data resource via the Customer API may require a respective {thingID} to retrieve the correct resource.

In some embodiments, different granular APIs may be able to retrieve the same resource. For example, both the ConnectionAPI and the ThingAPI have access to the associated {thingID} resource.

Selecting the at least one of the plurality of granular APIs according to the plurality of data identifiers may comprise selecting between at least two of the plurality of granular APIs wherein each of the at least two of the plurality of granular APIs are associated with a first data identifier of the plurality of data identifiers. Selecting between at least two of the plurality of granular APIs may comprise determining whether any of the at least two of the plurality of granular APIs is associated with a second data identifier of the plurality of data identifiers. For example, selection of the granular APIs to retrieve the resources may comprise selecting the fewest number of granular APIs needed to retrieve all of the resources. In some embodiments, selection of the granular APIs to retrieve the resources may comprise selecting the fastest granular APIs to retrieve all of the resources.

Selection of the granular APIs may comprise construction of a workflow that schedules the granular APIs and/or identifies which APIs may be executed in parallel. For example, a granular API that takes 200 ms to execute may be performed concurrently with a first granular API comprising a dependency for a second granular API, each of which may execute more quickly (individually and/or in total) than 200 ms.

Method 200 may then proceed to block 230 where device 100 may retrieve at least one of the plurality of available resources via the at least one of the plurality of granular APIs. In some embodiments, retrieve data resource instructions 134 may retrieve, via the at least one granular API for the at least one of the plurality of data identifiers, a data resource. For example, upon receipt of the message, the central dynamic API may parse the message for the data identifiers and identify which granular APIs need to be executed. The central dynamic API may then execute the granular API methods to retrieve each of those data resources. For example, upon parsing the {thingType} data identifier, the dynamic API may execute the granular API from http://www.example.com/thing/thingType to retrieve the associated data resource.

In some embodiments, retrieving the at least one of the plurality of available resources may comprise device 100 determining whether the at least one of the plurality of granular APIs is unable to retrieve the at least one of the available resources. In response to determining that the at least one of the plurality of granular APIs is unable to retrieve the at least one of the available resources, device 100 may determining whether the at least one of the available resources comprises an optional or a required resource according to the received message.

For example, the message from a client may designate some of the data identifiers as required while some may be designated as optional. In some embodiments, some resources may have dependencies on other resources, and those other resources may be considered required resources. If the resource that is unable to be retrieved is optional, method 200 may continue to proceed as described and others of the requested resources may be provided to the client. If the at least one of the available resources does not comprise an optional resource according to the received message, device 100 may instead provide an error report to the client.

Method 200 may then proceed to block 235 where device 100 may create a response message comprising the retrieved at least one of the plurality of available resources. In some embodiments, provide data resource instructions 136 may provide the retrieved data resources to the client. For example, if an XML message comprising the data identifiers is received, a response XML message may be constructed replacing the data identifiers with the retrieved data resources Method 200 may then end at block 240.

Figure 3:
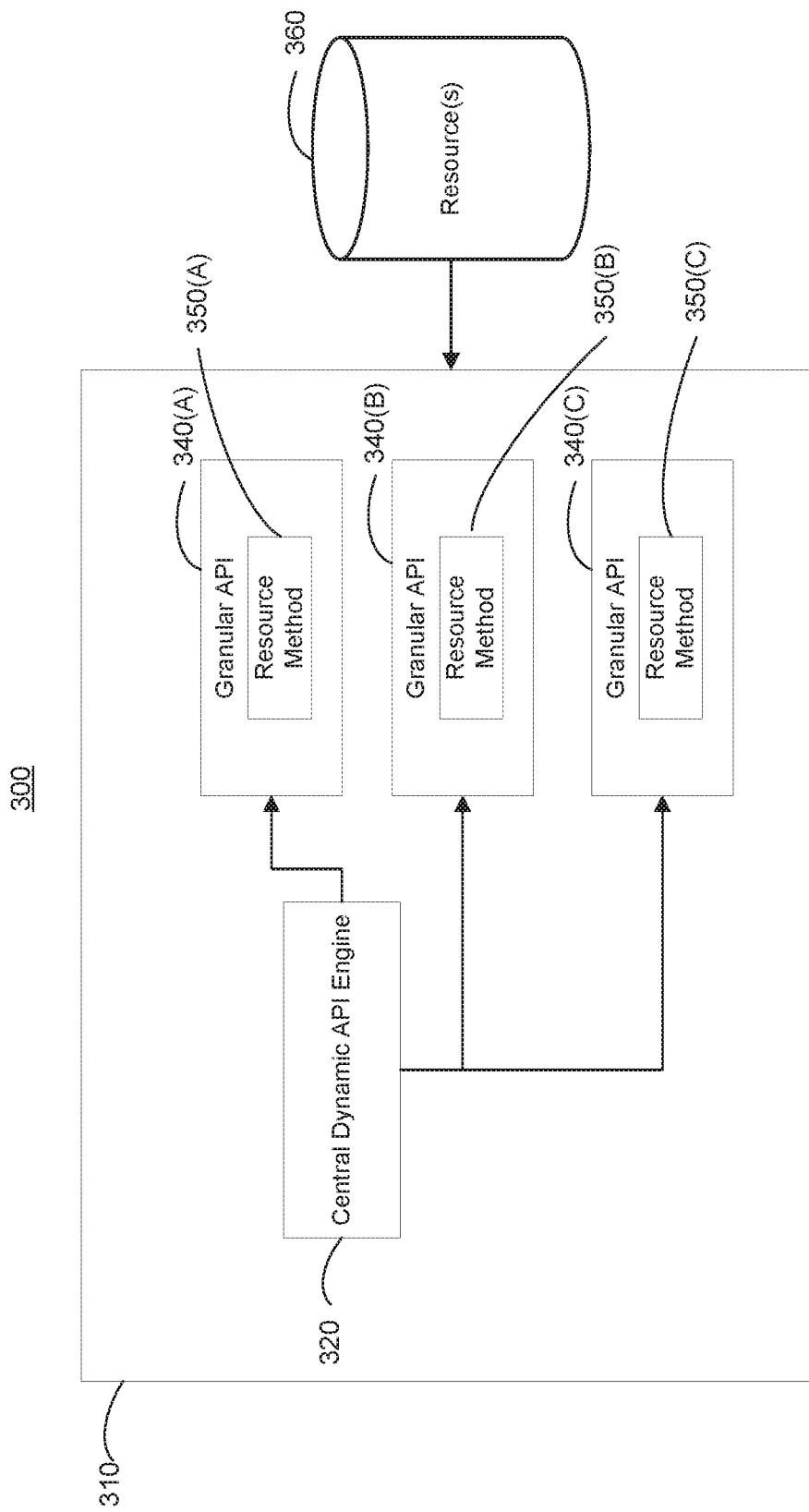
FIG. 3 is a block diagram of a system for dynamic messaging consistent with disclosed implementations.

FIG. 3 is a block diagram of a system 300 for dynamic messaging consistent with disclosed implementations. System 300 may comprise a computing device 310 comprising a central dynamic API engine 320 and a plurality of granular APIs 340(A)-(C). Each of plurality of granular APIs 340 (A)-(C) may comprise a respective resource method 350 (A)-(C). Resource methods 350(A)-(C) may communicate and interact with a plurality of resources 360.

Computing device 310 may comprise, for example, a general and/or special purpose computer, server, mainframe, desktop, laptop, tablet, smart phone, game console, and/or any other system capable of providing computing capability consistent with providing the implementations described herein. Central dynamic API engine 320 may comprise, for example, instructions stored a machine readable medium executable by a processor, logic circuitry, and/or other implementations of hardware and/or software.

Central dynamic API engine 320 may register a plurality of granular APIs, wherein each of the plurality of granular APIs are associated with at least one of a plurality of available resources 360. In some embodiments, map data identifier instructions 130 may register a plurality of granular APIs and generate the plurality of identifiers according to the registered plurality of granular APIs. For example, each granular API may register itself via an associated programmatic object to a central dynamic API. The central dynamic API may provide a published list of identifiers associated with the data resources and/or methods made available by each of the granular APIs as a message template.

Central dynamic API engine 320 may generate a map of the association between each of the plurality of granular APIs and a data identifier for each of the plurality of available resources. In some embodiments, map data identifier instructions 130 may map each of a plurality of data identifiers to at least one granular application programming interface (API), For example, each of the granular APIs may be responsible for retrieving at least one data resource and/or performing at least one method.

In some embodiments, system 300 may map each of the plurality of granular APIs to each of a plurality of available resources. For example, a granular API named ThingAPI may be accessed via HTTP at a uniform resource locator (URL) address of http://www.example.com/thing, an API named CustomerAPI may be accessed via HTTP at a URL of http://www.example.com/customer/, and an API named ConnectionAPI may be accessed via HTTP at a URL of http://www.example.com/connection/. Table 1, above, illustrates how different data resources may be mapped to the granular APIs. In some embodiments, the path may be appended to the URL for the respective granular API to access the individual resource.

Central dynamic API engine 320 may receive a request message comprising a plurality of data identifiers. In some embodiments, receive message instructions 132 may receive a message comprising at least one of the plurality of data identifiers from a client. For example, a web application may provide a message to the central dynamic API comprising a plurality of data identifiers. In some embodiments, the message may be programming language and/or format-independent. In some embodiments, the message may adhere to the format of the message template published by the central dynamic API. For example, the message may be provided via a standard communication protocol, such as TCP/IP and/or HTTP, with a message payload simply comprising a list of data identifiers. Using the example data resources in Table 1, a message payload may simply comprise the following: "{thingType}: {thingID}, Email: {email}."

Central dynamic API engine 320 may select a subset of the granular APIs associated with the plurality of identifiers according to the generated map. For example, retrieve data resource instructions 134 may identify which of the mapped granular APIs are able to retrieve the resources for the data identifiers in the message.

In some embodiments, at least one dependency between the at least one granular API and a second granular API may be identified. For example, retrieving an {email} data resource via the Customer API may require a respective {thingID} to retrieve the correct resource.

In some embodiments, different granular APIs may be able to retrieve the same resource. For example, both the ConnectionAPI and the ThingAPI have access to the associated {thingID} resource.

Selecting the at least one of the plurality of granular APIs according to the plurality of data identifiers may comprise selecting between at least two of the plurality of granular APIs wherein each of the at least two of the plurality of granular APIs are associated with a first data identifier of the plurality of data identifiers. Selecting between at least two of the plurality of granular APIs may comprise determining whether any of the at least two of the plurality of granular APIs is associated with a second data identifier of the plurality of data identifiers. For example, selection of the granular APIs to retrieve the resources may comprise selecting the fewest number of granular APIs needed to retrieve all of the resources. In some embodiments, selection of the granular APIs to retrieve the resources may comprise selecting the fastest granular APIs to retrieve all of the resources.

Central dynamic API engine 320 may identify a workflow order for the selected subset of the granular APIs. For example, construction of a workflow may schedule the granular APIs and/or identify which APIs may be executed in parallel. For example, a granular API that takes 200 ms to execute may be performed concurrently with a first granular API comprising a dependency for a second granular API, each of which may execute more quickly (individually and/or in total) than 200 ms.

Central dynamic API engine 320 may determine whether at least one of the selected subset of granular APIs is unable to retrieve a respective available resource and, in response to determining that the at least one of the selected subset of granular APIs is able to retrieve the respective available resource, create a response message comprising a respective subset of the plurality of available resources corresponding to the plurality of data identifiers. For example, system 300 may retrieve at least one of the plurality of available resources 360 via at least one of the plurality of granular APIs 350(A)-(C). In some embodiments, upon receipt of the message, the central dynamic API may parse the message for the data identifiers and identify which granular APIs need to be executed. The central dynamic API may then execute the granular API methods to retrieve each of those data resources. For example, upon parsing the {thingType} data identifier, the dynamic API may execute the granular API from http://www.example.com/thing/thingType to retrieve the associated data resource.

Central dynamic API engine 320 may, in response to determining that the at least one of the selected subset of granular APIs is unable to retrieve the respective available resource, determine whether the respective available resource comprises a required resource and, in response to determining that the respective available resource comprises the required resource, create a response message comprising an error.

In some embodiments, retrieving the at least one of the plurality of available resources may comprise device 100 determining whether the at least one of the plurality of granular APIs is unable to retrieve the at least one of the available resources. In response to determining that the at least one of the plurality of granular APIs is unable to retrieve the at least one of the available resources, device 100 may determining whether the at least one of the available resources comprises an optional or a required resource according to the received message.

For example, the message from a client may designate some of the data identifiers as required while some may be designated as optional. In some embodiments, some resources may have dependencies on other resources, and those other resources may be considered required resources. If the resource that is unable to be retrieved is optional, method 200 may continue to proceed as described and others of the requested resources may be provided to the client. If the at least one of the available resources does not comprise an optional resource according to the received message, device 100 may instead provide an error report to the client.

The disclosed examples may include systems, devices, computer-readable storage media, and methods for progressive buffer generation. For purposes of explanation, certain examples are described with reference to the components illustrated in FIGS. 1-3. The functionality of the illustrated components may overlap, however, and may be present in a fewer or greater number of elements and components. Further, all or part of the functionality of illustrated elements may co-exist or be distributed among several geographically dispersed locations. Moreover, the disclosed examples may be implemented in various environments and are not limited to the illustrated examples.

Moreover, as used in the specification and the appended claims, the singular forms "a," "an," and "the" are intended to include the plural forms as well, unless the context indicates otherwise. Additionally, although the terms first, second, etc, may be used herein to describe various elements, these elements should not be limited by these terms. Instead, these terms are only used to distinguish one element from another.

Further, the sequence of operations described in connection with the Figures are examples and are not intended to be limiting. Additional or fewer operations or combinations of operations may be used or may vary without departing from the scope of the disclosed examples. Thus, the present disclosure merely sets forth possible examples of implementations, and many variations and modifications may be made to the described examples. All such modifications and variations are intended to be included within the scope of this disclosure and protected by the following claims.

I claim:

1. A non-transitory machine-readable storage medium including instructions for dynamic messaging which, when executed by a processor, causes the processor to:
   map each of a plurality of data identifiers to at least one granular application programming interface (API);
   receive a message comprising at least one of the plurality of data identifiers from a client;
   retrieve, via the at least one granular API for the at least one of the plurality of data identifiers, a first data resource of a plurality of data resources, wherein retrieving the first data resource comprises:
   determining whether the at least one of the plurality of granular APIs is unable to retrieve a second resource of the plurality of data resources;
   in response to determining that the at least one of the plurality of granular APIs is unable to retrieve the second resource, determining whether the second resource comprises an optional resource according to the received message; and
   in response to determining that the second resource comprises an optional resource according to the received message, provide the retrieved first data resource to the client.

2. The non-transitory machine-readable medium of claim 1, wherein the plurality of data identifiers are selected from a message template of available data identifiers.

3. The non-transitory machine-readable medium of claim 2, wherein the instructions to map each of the plurality of data identifiers to the at least one granular API comprise instructions to:

register a plurality of granular APIs; and
generate the plurality of identifiers according to the registered plurality of granular APIs.

4. The non-transitory machine-readable medium of claim 1, wherein the message is programming language-independent.

5. The non-transitory machine-readable medium of claim 1, wherein the instructions to provide the retrieved data resources to the client comprise providing the retrieved data resources in a same message format as the received message.

6. The non-transitory machine-readable medium of claim 1, wherein the instructions to retrieve the data resource comprise instructions to identify at least one dependency between the at least one granular API and a second granular API.

7. The non-transitory machine-readable medium of claim 6, wherein the second granular API is associated with a third data resource.

8. A computer-implemented method for dynamic messaging comprising:
   registering a plurality of granular application programming interfaces (APIs);
   mapping each of the plurality of granular APIs to each of a plurality of available resources;
   receiving a message comprising a plurality of data identifiers associated with the plurality of available resources from a client;
   selecting at least one of the plurality of granular APIs according to the plurality of data identifiers;
   retrieving at least one of the plurality of available resources via the at least one of the plurality of granular APIs, wherein retrieving the at least one of the plurality of available resources comprises determining whether the at least one of the plurality of granular APIs is unable to retrieve the at least one of the available resources;
   in response to determining that the at least one of the plurality of granular APIs is unable to retrieve the at least one of the available resources, determining whether the at least one of the available resources comprises an optional resource according to the received message; and
   in response to determining that the at least one of the available resources comprises an optional resource according to the received message, providing at least one second resource of the plurality of available resources to the client; and
   creating a response message comprising the retrieved at least one of the plurality of available resources.

9. The computer-implemented method of claim 8, further comprising:
   in response to determining that the at least one of the available resources does not comprise an optional resource according to the received message, providing an error report to the client.

10. The computer implemented method of claim 9, wherein selecting the at least one of the plurality of granular APIs according to the plurality of data identifiers comprises selecting between at least two of the plurality of granular APIs wherein each of the at least two of the plurality of granular APIs are associated with a first data identifier of the plurality of data identifiers.

11. The computer-implemented method of claim 10, wherein selecting between at least two of the plurality of granular APIs comprises determining whether any of the at least two of the plurality of granular APIs is associated with a second data identifier of the plurality of data identifiers.

12. The computer-implemented method of claim 8, wherein selecting the at least one of the plurality of granular APIs according to the plurality of data identifiers comprises scheduling at least two of the plurality of granular APIs for parallel execution.

13. A system for dynamic messaging, comprising:
   a processor; and
   a central dynamic application programming interface (API) engine, the API engine including instructions stored on a machine readable medium that, when executed by the processor, cause the processor to:
      register a plurality of granular APIs, wherein each of the plurality of granular APIs is associated with at least one of a plurality of available resources from a client;
      generate a map of the association between each of the plurality of granular APIs and a data identifier for each of the plurality of available resources;
      receive a request message comprising a plurality of data identifiers;
      select a subset of the granular APIs associated with the plurality of identifiers according to the generated map;
      determine whether at least one of the selected subset of granular APIs is unable to retrieve a respective available resource;
      in response to determining that the at least one of the selected subset of granular APIs is unable to retrieve the respective available resource, determining whether the respective available resource is an optional resource according to the received message; and
      in response to determining that the respective available resource comprises an optional resource according to the received message, providing a different resource of the plurality of available resources to the client.

14. The system of claim 13, wherein the API engine further comprises instructions to identify a workflow order for the selected subset of the granular APIs.

15. The system of claim 13, wherein the API engine further comprises instructions to:
   determine whether at least one of the selected subset of granular APIs is able to retrieve the different resource; and
   in response to determining that the at least one of the selected subset of granular APIs is able to retrieve the respective available resource, create a response message comprising a respective subset of the plurality of available resources corresponding to the plurality of data identifiers, the subset including the different resource.

16. The system of claim 13, wherein the API engine further comprises instructions to:
   determine whether at least one of the selected subset of granular APIs is unable to retrieve the different resource; and
   in response to determining that the at least one of the selected subset of granular APIs is unable to retrieve the different resource, determine whether the different resource comprises a required resource; and
   in response to determining that the respective different resource comprises the required resource, create a response message comprising an error.

* * * * *